J. B. JONES.
RESILIENT TIRE.
APPLICATION FILED SEPT. 27, 1915. RENEWED AUG. 24, 1917.

1,243,303. Patented Oct. 16, 1917.

WITNESSES
Edw. S. Hall.

INVENTOR
Jesse B. Jones.

BY
ATTORNEY

UNITED STATES PATENT OFFICE.

JESSE B. JONES, OF ARCATA, CALIFORNIA.

RESILIENT TIRE.

1,243,303.     Specification of Letters Patent.     Patented Oct. 16, 1917.

Application filed September 27, 1915, Serial No. 52,913. Renewed August 24, 1917. Serial No. 188,066.

*To all whom it may concern:*

Be it known that I, JESSE B. JONES, a citizen of the United States, residing at Arcata, in the county of Humboldt and State of California, have invented certain new and useful Improvements in Resilient Tires, of which the following is a specification.

This invention relates to an improved resilient tire and the principal object of the invention is to provide a tire which can be formed principally of resilient metal such as steel, the tire including an improved type of body portion and an improved type of tread.

Another object of the invention is to so construct this tire that it can be easily put together and to further so construct the tire that when put together it will form a compact mass thus preventing any danger of any of the portions of the tire slipping out of place.

Another object of this invention is to so construct the tread of the tire that one portion of the same may be removed when worn out without it being necessary to renew the tread sections which are still serviceable.

Another object of the invention is to so construct the tire that it may be easily and quickly put in place upon the rim and securely held thereon.

This invention is illustrated in the accompanying drawings, wherein:—

Figure 1:
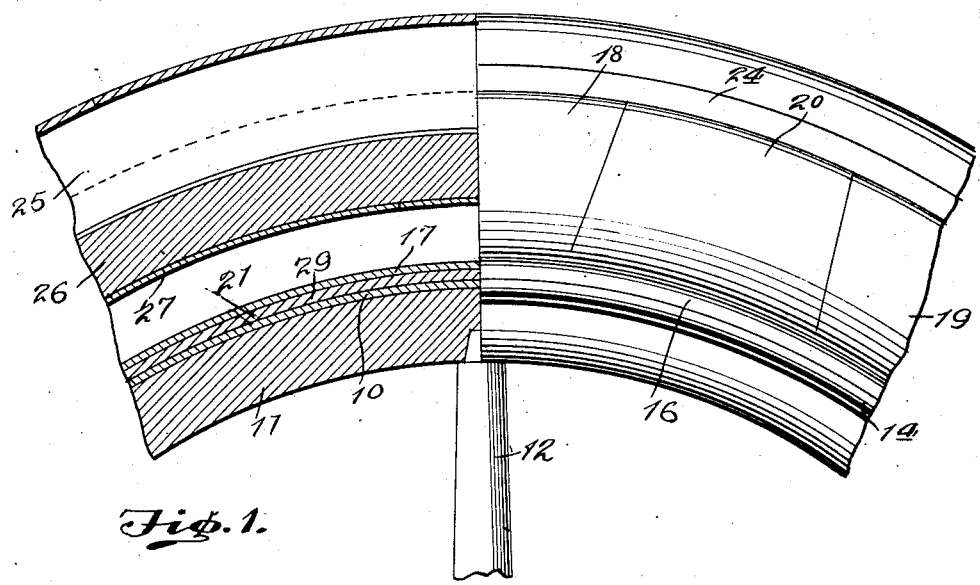
Figure 1 is a fragmentary view of the improved tire shown partially in side elevation and partially in section.

The rim 10 which carries the tire is mounted upon the wheel felly 11 with which the spokes 12 are connected and has its side portions extending beyond the sides of the felly and bent to provide pockets 13 and 14 to receive the tire securing rings 15 and 16. These securing rings 15 and 16 are elongated in cross section as shown in Fig. 2 so that they may be securely mounted in the pockets 13 and 14 and at the same time retain the firm grip upon the tire.

Figure 2:
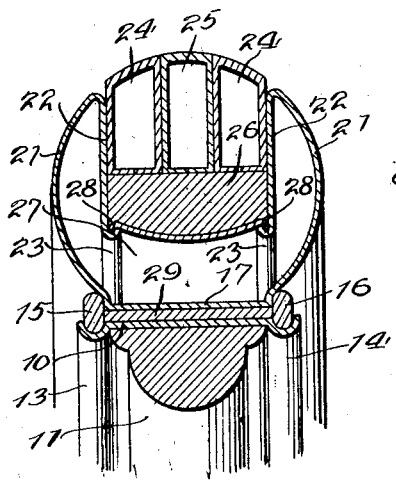
Fig. 2 is a transverse section through the improved tire and the carrying frame.

The body portion which is designated in general by the numeral 17 in Fig. 2 comprises two semi-circular sections 18 and 19 which abut at one end and at the opposite end are positioned in spaced relation and have their ends cut diagonally to provide a wedged shaped opening or pocket to receive the section 20 which also forms part of the body portion of the tire and provides means for holding the sections 18 and 19 in tight engagement when the section 20 is put in place. Each of these sections is formed as shown in Fig. 2 and is provided with the outwardly bowed side walls 21 which merge into the inner walls 22 terminating in flanges 23.

The tread which is formed of the sections 24 and 25 is positioned between the walls 22 of the body portion of the tire, the sections 24 and 25 resting upon the cushion 26 which is supported by the ring 27. This ring 27 which is slit transversely as shown in Fig. 1 is provided with side flanges 28 as shown in Fig. 2 which are engaged by the flanges 23 so that the cushion supporting ring 27 will be held in place between the walls 22. From an inspection of Fig. 2 it will also be readily seen that each of the tread rings is in the form of a tube rectangular in cross section, the tubes being formed of resilient material such as steel. It is of course, obvious that the number of tread rings could be changed if a greater number were desired. In assembling this tire the sections 18 and 19 of the body portion 17 will be placed on a support such as a bench with the straight cut ends of the sections abutting and the beveled ends in spaced relation. The cushion supporting band which is formed of resilient material is then put in place and will tend to hold the two sections 18 and 19 in the proper position. Of course, the band 27 has to be expanded somewhat in order to set it in place but the resiliency of this band causes it to return to the normal dimensions thus forming a very efficient holding means for the two sections of the body portion. The cushion 26 is then put in place after which the tread rings 24 and 25 will be put in place. The fact that the beveled ends of the two sections 18 and 19 are not in engagement permits the two sections to have sufficient play to permit the cushion 26 and tread rings to be put in place. After the cushion and tread rings are in place the two sections 18 and 19 will be spread sufficiently to permit the wedge section 20 to be slipped into place and the tire will then be completly assembled and ready to be applied to the automobile wheel. In doing this the securing ring 15 will be first put in place after which the cushion ring 29 is placed upon the rim 10 and the tire is then forced onto the cushion ring. The securing ring 16 is then put in place and the tire will be securely held upon the rim of the automobile.

When this tire is in use the pressure upon the tread rings will in turn press upon the cushion 26. Sufficient resiliency is thereby provided to take up jolts or jars received in going over rough places in a road. If one of the tread rings is worn out the tire can be easily taken apart and a new ring put in place. Therefore it is not necessary to replace all of the rings. I have therefore provided a resilient tire which is very simple and which will not be liable to puncture troubles.

What is claimed is:—

1. A resilient tire comprising a body portion including semi-circular sections and a wedging section for fitting between said semi-circular sections, each of said sections being provided with outwardly bowed side walls merging into inner walls positioned in spaced relation and terminating in flanges, a resilient cushion supporting band fitting between the inner walls of said body portion and provided with side flanges engaging the flanges of the inner walls of the body portion, a cushion fitting between the inner walls of the tire and fitting against said cushion supporting band, and tread rings positioned between the inner walls of said body portion and engaging said cushion.

2. A resilient tire comprising a body portion including semi-circular sections abutting at one end and having their opposite ends cut diagonally and positioned in spaced relation, a wedge shaped section fitting into the space between the inclined ends of said semi-circular sections, each of said sections being provided with outer side walls and inner side walls, a cushion supporting band formed of resilient material positioned between the inner walls of said body portion and in engagement with the inner walls, said cushion supporting band being slit transversely to permit of expansion and contraction, a cushion positioned between the inner walls of said body portion and resting upon said supporting band, and tread rings positioned between the inner walls of the body portion and resting upon said cushion.

3. A resilient tire comprising a body portion having its ends cut diagonally and positioned in spaced relation, a wedge-shaped section fitting into the space between the inclined ends of said body portion, a cushion supporting band formed of resilient material carried by said body portion, a cushion carried by said body portion and resting upon said supporting band, and tread rings carried by said body portion and resting upon said cushion.

4. A resilient tire comprising a resilient body portion including side walls, and having its ends cut diagonally and terminating in spaced relation, a wedging section fitting into the space between the ends of said body portion, a resilient cushion supporting element positioned between the walls of said body portion, a cushion fitting between the walls of the body portion upon said cushion supporting element, and tread rings fitting between the walls of the body portion upon said cushion.

In testimony whereof I affix my signature in presence of two witnesses.

JESSE B. JONES.

Witnesses:
L. G. BARKER,
WERNER N. MORGAN.